(12) United States Patent
Otani

(10) Patent No.: US 10,802,607 B2
(45) Date of Patent: Oct. 13, 2020

(54) LIGHT EMITTING DEVICE AND IMAGE DISPLAY SYSTEM

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 29 days.

(21) Appl. No.: 16/245,784

(22) Filed: Jan. 11, 2019

(65) Prior Publication Data

US 2019/0220103 A1 Jul. 18, 2019

(30) Foreign Application Priority Data

Jan. 12, 2018 (JP) ................... 2018-003159

(51) Int. Cl.
| | |
|---|---|
| G02B 27/09 | (2006.01) |
| G03B 21/20 | (2006.01) |
| F21V 5/00 | (2018.01) |
| H04N 9/31 | (2006.01) |
| G06F 3/03 | (2006.01) |
| G02B 19/00 | (2006.01) |

(52) U.S. Cl.
CPC ............ *G06F 3/0304* (2013.01); *F21V 5/004* (2013.01); *F21V 5/008* (2013.01); *G02B 19/0014* (2013.01); *G02B 19/0052* (2013.01); *G02B 27/0927* (2013.01); *G02B 27/0961* (2013.01); *G03B 21/208* (2013.01); *H04N 9/3161* (2013.01); *H04N 9/3164* (2013.01)

(58) Field of Classification Search
CPC .......... G06F 3/0304; H04N 9/31–3197; G02B 27/0927; G02B 27/0961; G02B 27/01–0189; G02B 2027/0105–0198; G02B 5/00–32; G02B 7/00–40; F21V 5/004; F21V 5/008; G03B 21/00–64
See application file for complete search history.

(56) References Cited

U.S. PATENT DOCUMENTS

| | | |
|---|---|---|
| 2013/0002612 A1 | 1/2013 | Liu et al. |
| 2015/0116216 A1 | 4/2015 | Sakai et al. |
| 2019/0174105 A1* | 6/2019 | Kaneda ................ H04N 9/3164 |

FOREIGN PATENT DOCUMENTS

| | | |
|---|---|---|
| EP | 3176636 A1 | 6/2017 |
| JP | 2015-111385 A | 6/2015 |

OTHER PUBLICATIONS

May 10, 2019 Extended Search Report issued in European Application No. 19151157.5.

* cited by examiner

*Primary Examiner* — Michelle M Iacoletti
*Assistant Examiner* — Christopher A Lamb, II
(74) *Attorney, Agent, or Firm* — Oliff PLC

(57) ABSTRACT

A light emitting device uses optical elements each formed of a plurality of small lenses. On that basis, the array pitch of the plurality of small lenses is set within a predetermined numerical range determined based on a proportional relationship between two values with respect to the focal distance of a collimator.

11 Claims, 16 Drawing Sheets

LIGHT EMITTING DEVICE AND IMAGE DISPLAY SYSTEM

BACKGROUND

1. Technical Field

The present invention relates to a light emitting device applicable to, for example, a projector as an image display system, and an image display system using the light emitting device.

2. Related Art

In the past, there has been known an image display system which detects a position of a pointing body (e.g., a pen or a finger of the user) operated on a display surface on which an image is displayed, and then performs display in accordance with a trajectory of the pointing body and a change in display based on the detection result. For example, there has been disclosed an image display system which is provided with a projector and a light emitting device for emitting light along a projection surface on which the projector performs projection, the projector detecting the position of the pointing body due to reflection of the light by the pointing body operated on the projection surface to perform projection based on the detection result (see, e.g., JP-A-2015-111385 (Document 1)).

The light emitting device described in Document 1 is provided with a light source, a collimator as a lens for collimating the light emitted from the light source, and a directional lens (a Powell lens) for making the light in a direction (a first direction) along the projection surface wide-angle out of the light collimated by the collimator. It should be noted that the Powell lens is formed to have a convex shape on the light incident side and a flat shape on the light emission side viewed from a second direction perpendicular to the first direction, and is formed to have a rectangular shape viewed from the first direction.

However, in the light emitting device described in Document 1, if the relative position between the light source and the Powell lens is misaligned, unevenness of the light intensity on the projection surface becomes conspicuous, and therefore, in Document 1 described above, it becomes difficult for the projector to accurately detect the position of the pointing body. Therefore, the light emitting device described in Document 1 needs the man-hour for the alignment between the light source and the Powell lens.

In order to solve the problem described above, it is conceivable to dispose the Powell lenses in an array. By disposing them in an array, it can be expected to achieve reduction in size and reduction in required assembly accuracy. It should be noted that it is necessary to make the array pitch finer than a certain level in order to reduce the intensity unevenness due to the assembly accuracy on the one hand, but if the array pitch is made too fine, there is a possibility that diffraction of light occurs and an interference pattern appears on the other hand.

SUMMARY

An advantage of some aspects of the invention is to provide a light emitting device which makes it possible to maintain a good emission state of the light by preventing the intensity unevenness and the diffraction due to the arrayed lenses from occurring while achieving the reduction in size of the device and the reduction in required assembly accuracy using the arrayed lenses, and providing an image display system using the light emitting device.

A light emitting device according to an aspect of the invention includes a light source adapted to emit light, a collimator adapted to collimate the light emitted from the light source, and an optical element having a plurality of lenses adapted to make the light having passed through the collimator wide-angle with respect to a direction corresponding to a first direction out of the first direction and a second direction extending in respective directions different from each other with respect to an optical axis of the light source, the lenses are arranged along the first direction, and an array pitch in the first direction of the lenses is proportional to a focal distance of the collimator within a predetermined numerical range.

In the light emitting device described above, reduction in size of the device and reduction in required assembly accuracy are achieved by using the optical element formed of the small lenses. On that basis, by further setting the array pitch of each of the plurality of lenses within the predetermined numerical range determined based on the proportional relationship between the both factors with respect to the focal distance of the collimator, it is possible to prevent the intensity unevenness and the diffraction due to the plurality of lenses constituting the optical element from occurring to maintain the good emission state of the light.

In a specific aspect of the invention, the array pitch of the plurality of lenses to the focal distance of the collimator is determined in accordance with an emission state of the light from the light source. In this case, it is possible to make the lenses appropriate in accordance with, for example, the wavelength and a spreading state of the light from the light source.

In another aspect of the invention, in a case of assuming the focal distance of the collimator as f mm, the array pitch in the first direction of the lenses as P mm, a wavelength of the light from the light source as $\lambda$ μm, a width in the first direction of the light source as L μm, and an angular width in the first direction of the light from the light source as W°, the following is fulfilled.

$$f \leq 0.638 \frac{L}{\lambda} P \quad (1)$$

$$f \geq \frac{124.8}{W} P \quad (2)$$

In this case, it is possible to prevent the diffraction from occurring by fulfilling the formula (1) described above, and at the same time, it is possible to suppress the intensity unevenness by fulfilling the formula (2) described above.

In still another aspect of the invention, the array pitch in the first direction of the lenses has different values in a predetermined range in the optical element, and in a case of assuming the focal distance of the collimator as f mm, a central value of the array pitch in the first direction of the plurality of lenses as P mm, a wavelength of the light from the light source as $\lambda$ μm, a width in the first direction of the light source as L μm, and an angular width in the first direction of the light from the light source as W°, the following is fulfilled.

$$f \leq 1.28 \frac{L}{\lambda} P \quad (3)$$

-continued $$f \geq \frac{124.8}{W}P \quad (4)$$

In this case, it is possible to prevent the diffraction from occurring by the array pitch in the first direction of the plurality of lenses fulfilling the formula (3) described above while being provided with different values within the predetermined range, and at the same time, it is possible to suppress the intensity unevenness by fulfilling the formula (4) described above.

In still another aspect of the invention, the angular width of the light from the light source is in a range having intensity of no lower than 10% to a maximum intensity of the light. In this case, for example, when applying the light emitting device to an image display system, it is possible to determine a good emission state of the light with reference to the component of the light having the intensity at an available level.

In still another aspect of the invention, more than two of the plurality of lenses are included in an effective width of a pencil by the light from the light source. In this case, it is possible to sufficiently homogenize the light from the light source side in the plurality of lenses.

In still another aspect of the invention, the first direction and the second direction are perpendicular to the optical axis of the light source, and are perpendicular to each other.

An image display system according to an aspect of the invention includes any one of the light emitting devices described above, a detection device adapted to detect a reflection position of light emitted from the light emitting device, and a projection device adapted to project an image corresponding to a detection result detected by the detection device.

In the image display system described above, by providing the light emitting device, it is possible to perform so-called interactive image display for performing display in accordance with the trajectory of the pointing body and a change in display based on the detection result by the detection device. On this occasion, in particular, in the light emitting device, since it is possible to keep the good light emission state by preventing the diffraction from occurring while achieving reduction in size of the device and reduction in required assembly accuracy, it is possible to maintain the detection accuracy in the detection device in a high state.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

An example of a light emitting device and an image display system according to a first embodiment will hereinafter be described with reference to FIG. 1 and so on.

Figure 1:
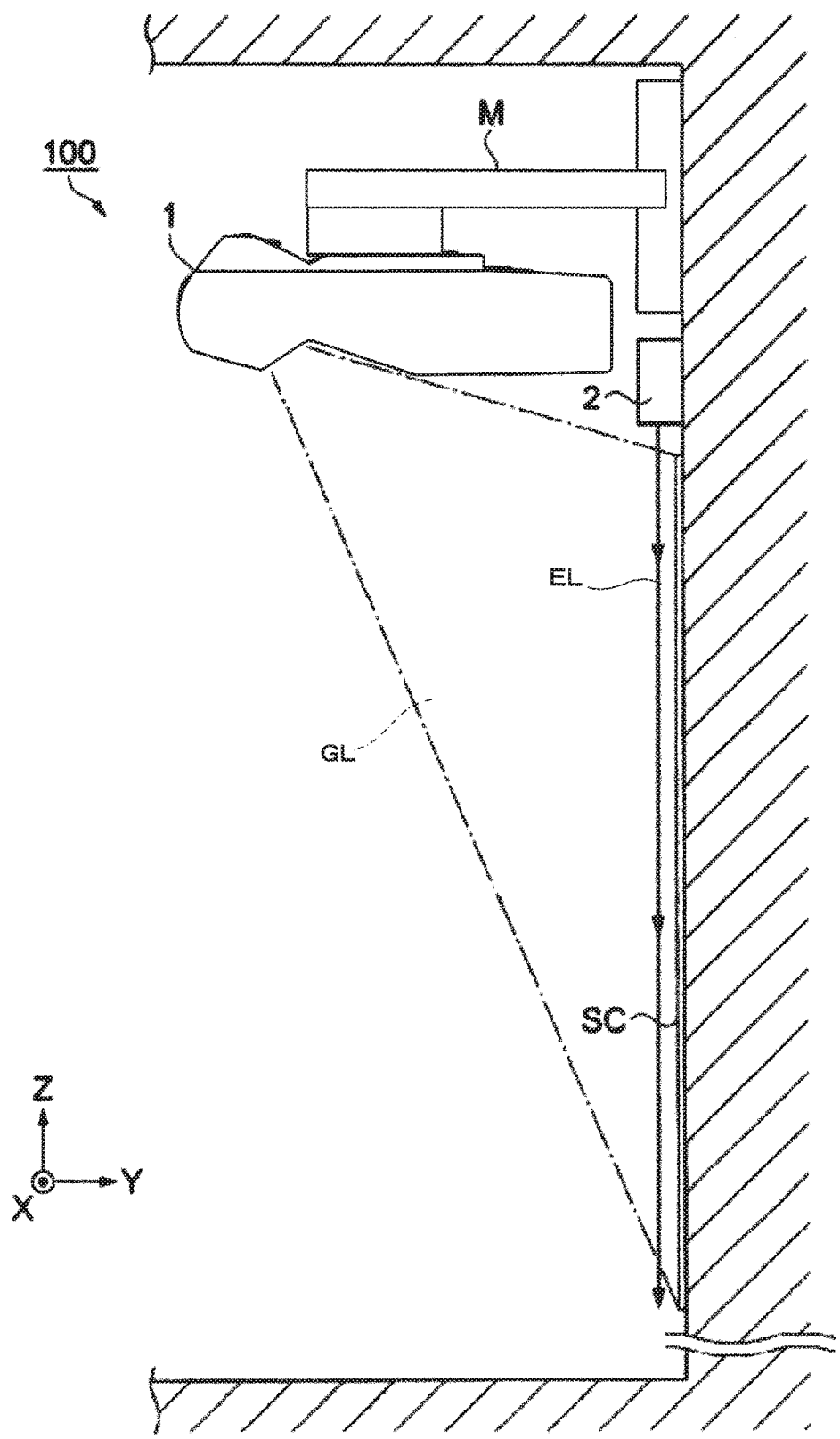
FIG. 1 is a schematic diagram showing a schematic configuration of an image display system according to a first embodiment of the invention.
Figure 2:
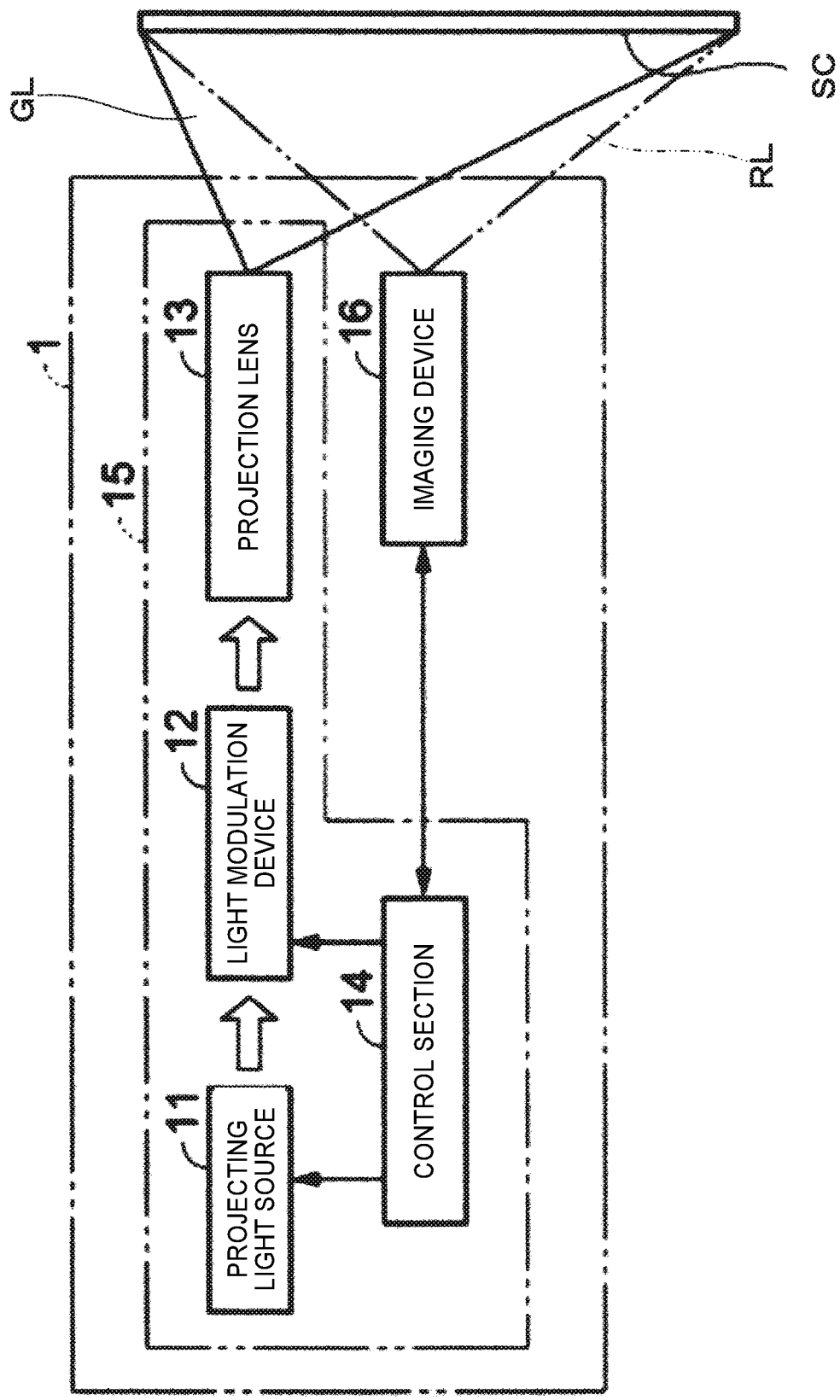
FIG. 2 is a block diagram showing a schematic configuration of the image display system.

As conceptually shown in FIG. 1, the image display system 100 according to the present embodiment is provided with a projector 1 and a light emitting device 2. Further, as shown in FIG. 2, the projector 1 is provided with a projection device 15 as a main body part for performing image projection, and an imaging device 16 as a detection device for detecting reflected light RL which is a component caused by light EL (see FIG. 1) emitted from the light emitting device 2.

The projection device 15 is provided with a projecting light source 11, a light modulation device 12, a projection lens 13 and a control section 14, and projects image light GL from the projection lens 13 in order to project an image corresponding to image information input to the projection device 15 and an image corresponding to the detection result detected by the imaging device 16. As shown in FIG. 1, the projector 1 is supported by a support device M installed on a wall surface above an irradiation target surface SC such as a screen or a whiteboard, and projects the image on the irradiation target surface SC from a side facing downward. It should be noted that for the sake of convenience of explanation, the description will hereinafter be presented defining the normal direction of the irradiation target surface SC as a front-back direction, a direction toward the irradiation target surface SC as a frontward direction (a +Y direction), a direction defying the gravity as an upward direction (a +Z direction), and a right hand side of an observer facing to the irradiation target surface SC as a rightward direction (a +X direction) as shown in FIG. 1. The irradiation target surface SC is formed as a surface parallel to an X-Z plane.

The projection device 15 modulates the light emitted from the projecting light source 11 using the light modulation device 12 in accordance with the image information, and then projects the light thus modulated from the projection lens 13 on the irradiation target surface SC. It should be noted that as the light modulation device 12, it is possible to use a device using a liquid crystal panel, a micromirror type device such as a device using a DMD and so on.

The control section 14 is a device provided with a CPU, a ROM, a RAM and so on to function as a computer, and performs, for example, control related to projection of the image based on the information output from the imaging device 16 in addition to control of an operation of the projector 1.

As shown in FIG. 1, the light emitting device 2 is installed on the wall surface above the irradiation target surface SC forming a target plane, and emits the light EL along the irradiation target surface SC. Here, for example, a laser infrared beam having a peak light intensity at a wavelength of about 940 nm is emitted as the light EL.

The imaging device 16 is provided with imaging elements (not shown) such as CCD or CMOS, shoots the irradiation surface SC irradiated with the image light GL, and then outputs the information obtained by shooting to the control section 14. On this occasion, in addition to the above, by detecting the reflected light RL, which is a component of the light RL as the infrared light emitted from the light emitting device 2 and reflected by the irradiation target surface SC and a pointing body (e.g., a pen or a finger of the user) located in the vicinity of the irradiation target surface SC, the imaging device 16 detects the position (a reflection position) of the pointing body and then outputs the information thus detected to the control section 14. The projector 1 analyzes the position of the pointing body on the irradiation target surface SC based on the information output from the imaging device 16, and then performs, for example, projection of a superimposed image obtained by superimposing a line representing the trajectory of the pointing body on the image information, and a change in the image to be projected based on the analysis result. Due to the above, it is possible to perform interactive image display which is the image display corresponding to an action of the user on the irradiation target surface SC.

Figure 3:
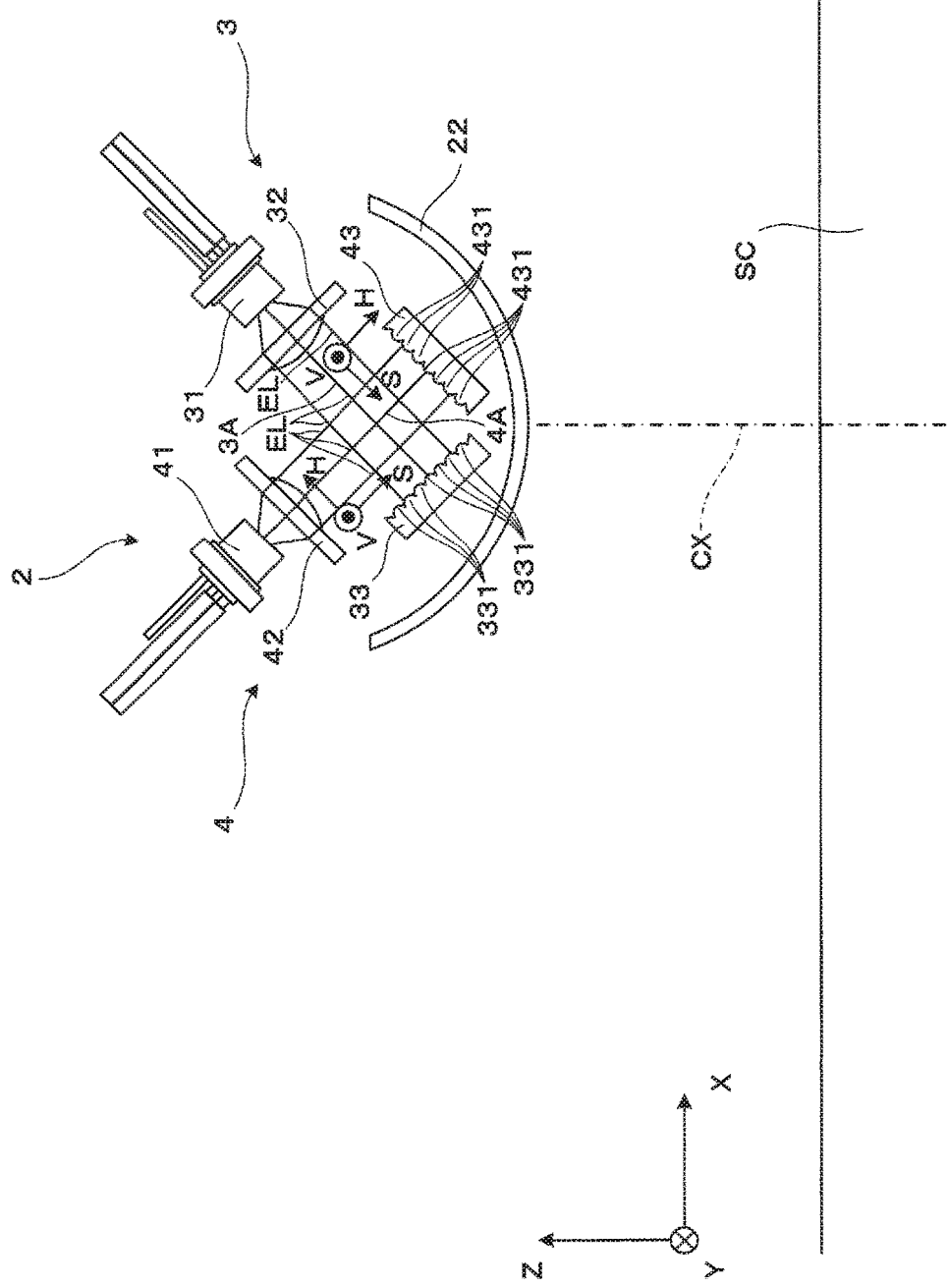
FIG. 3 is a schematic diagram showing a schematic configuration of a light emitting device according to the first embodiment.

The configuration of the light emitting device 2 will hereinafter be described in more detail with reference to FIG. 3. FIG. 3 is a schematic diagram showing a schematic configuration of the light emitting device 2. The light emitting device 2 is separated from the irradiation target surface SC in the upward direction (on the +Z side), and is disposed at roughly the center of the irradiation target surface SC in a horizontal direction. In other words, the light emitting device 2 is located along a central position CX of the irradiation target surface SC. The light emitting device 2 is provided with a first light emitting section 3, a second light emitting section 4 and a cover glass 22 for covering the first light emitting section 3 and the second light emitting section 4. Among these, the first light emitting section 3 and the second light emitting section 4 form a pair of bilaterally symmetric constituents.

In the light emitting device 2, the first light emitting section 3 is provided with a first light source 31, a first collimator 32 and a first optical element 33. In the first light emitting section 3, the first collimator 32 and the first optical element 33 are disposed on a first optical axis 3A of the first light source 31, and the first light emitting section 3 emits the light obliquely to the lower left.

Meanwhile, the second light emitting section 4 is provided with a second light source 41, a second collimator 42 and a second optical element 43 similarly to the first light emitting section 3. In the second light emitting section 4, the second collimator 42 and the second optical element 43 are disposed on a second optical axis 4A of the second light source 41, and the second light emitting section 4 emits the light obliquely to the lower right. Therefore, the first light emitting section 3 and the second light emitting section 4 constituting the light emitting device 2 emit the light EL in the respective directions different from each other.

The first optical axis 3A and the second optical axis 4A cross each other between the first collimator 32 and the first optical element 33 and between the second collimator 42 and the second optical element 43. In other words, in the light emitting device 2, there is a configuration in which the light emitted from the first light emitting section 3 and the light emitted form the second light emitting section 4 partially overlap each other.

The light sources 31, 41 are each a laser source for emitting the light having the peak light intensity at the wavelength of about 940 nm as already described, and are each configured including, for example, an active layer serving as a light emission part and cladding layers respectively stacked on both sides of the active layer. As the light sources 31, 41, there is used a laser source of a type such as a multimode oscillation type in which the light distribution characteristics are different between a first direction H parallel to the active layer and a stacking direction (a second direction V) perpendicular to the first direction H and in which the active layer and the cladding layers are stacked. Here, the light from each of the light sources 31, 41 is emitted in a third direction S perpendicular to the first direction H and the second direction V, the third direction S is set to a direction parallel to corresponding one of the optical axes 3A, 4A. It should be noted that in the present embodiment, the first direction H and the third direction S are set to the directions parallel to the irradiation target surface SC shown in FIG. 1, namely made parallel to an X-Z plane.

The collimators 32, 42 each roughly collimate the light emitted from each of corresponding one of the light sources 31, 41. In other words, the collimators 32, 42 each collimate the incident light. For example, the collimator 32 makes component light emitted from a point on the first optical axis 3A in the light source 31 and spreading at an angle with the first optical axis 3A proceed so as to roughly be parallel to the first optical axis 3A.

The optical elements 33, 34 are each formed of synthetic resin or the like high in refractive index so as to have a rectangular shape in a planar view. As shown in FIG. 3, the optical element 33 is provided with a plurality of small lenses 331 or a plurality of lenses 331 disposed on the incident side of the light, and is formed to have a flat shape on the emission side of the light. Each of the small lenses 331 uniformly extends along one side of the rectangular shape, namely in parallel to the second direction V, and each of the small lenses 331 is arranged along a direction perpendicular to this side, namely the first direction H. In other words, the optical element 33 is disposed in the first light emitting section 3 so as to have the state in which each of the small lenses 331 is arranged along the first direction H, and each of the small lenses 331 extends in the second direction V.

Figure 6:
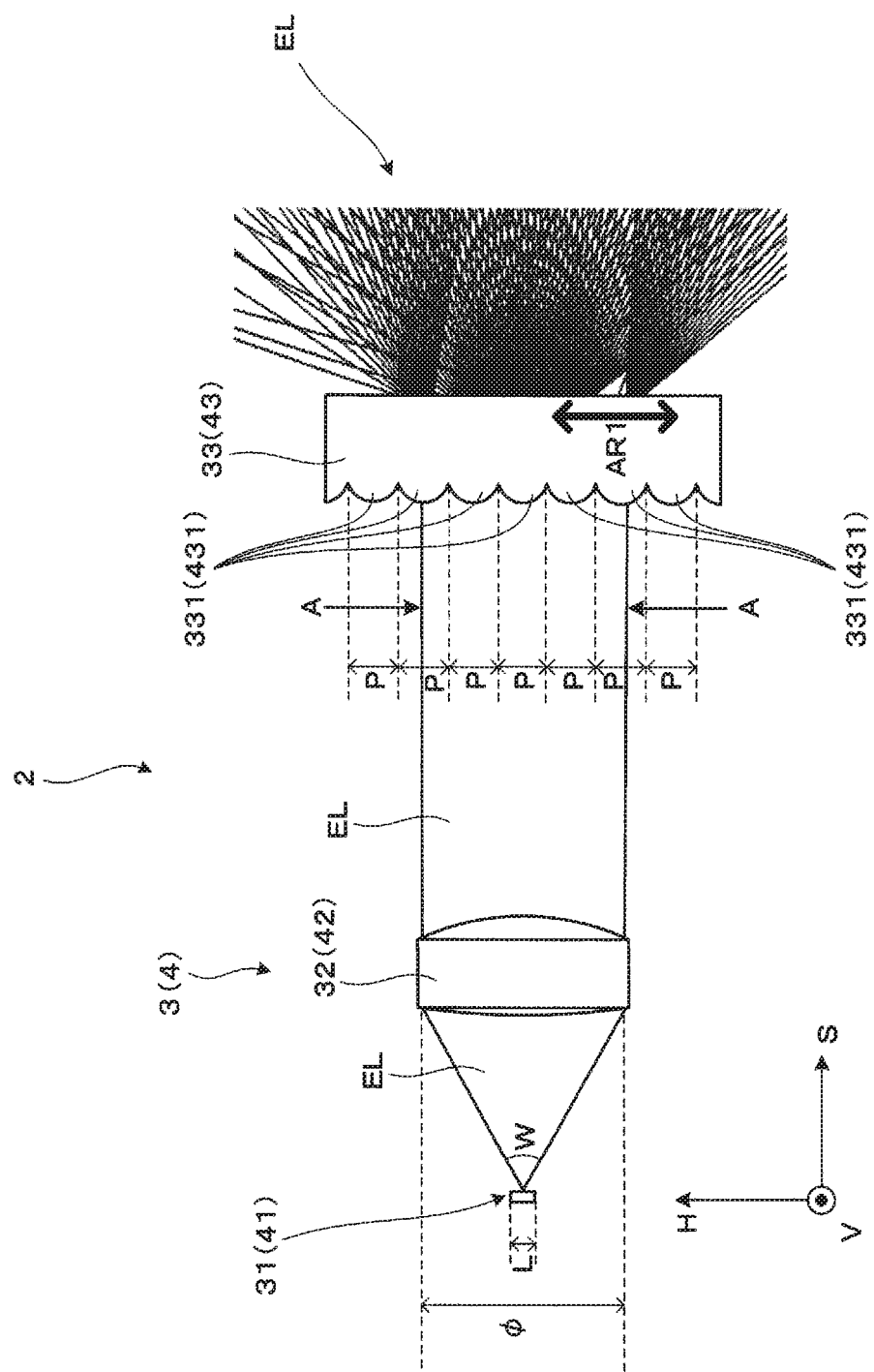
FIG. 6 is a side view showing an example with respect to a condition of the light emitted from a light source.

The optical element 33 makes the light EL having passed through the collimator 32 wide-angle in the first direction H while maintaining the direction of the light EL having passed through the collimator 32 to be collimated by the collimator 32 in the second direction V, and then emits the light EL centering on the optical axis 3A. In other words, the optical element 33 makes the light EL entering the optical element 33 wide-angle only in the direction corresponding to the first direction H out of the directions perpendicular to the optical axis 3A. On this occasion, due to the small lenses 331 constituting the optical element 33, the light EL becomes in the state of being superimposed with each other while being made wide-angle. Substantially the same is performed also in the optical element 43. Specifically, the optical element 43 makes the light EL having passed through the collimator 42 wide-angle only in the direction corresponding to the first direction H, and on this occasion, due to a plurality of small lenses 431 or a plurality of lenses 431, the light EL becomes in the state of being superimposed with each other while being made wide-angle. It should be noted that FIG. 6 shows an example of the condition of making the light EL wide-angle by such a plurality of small lenses 331, 431 as described above.

Figure 8A:
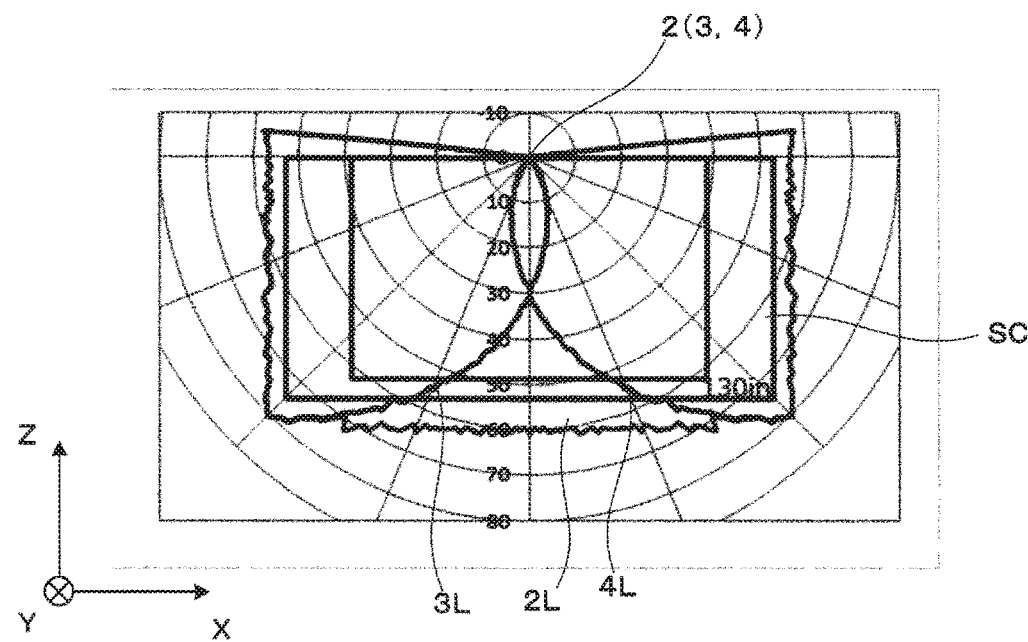
FIG. 8A is a schematic diagram showing an intensity distribution of the light emitted from the light emitting device with respect to an irradiation target surface.

By providing such a configuration as described above, the light emitting device 2 according to the present embodiment irradiates throughout the irradiation target surface SC and the entire area adjacent to the irradiation target surface SC with the light EL in the case of being installed in the image display system 100 as shown in, for example, FIG. 1, then a part of the component of the light EL is reflected when the pointing body comes to the irradiation area of the light EL, and then the imaging device 16 detects the part thus reflected. Thus, the appropriate detection of the pointing body is achieved. It should be noted that FIG. 8A shows an example of the intensity distribution of the light in an area along the irradiation target surface SC with respect to an emission component from the first light emitting section 3 and an emission component from the second light emitting section 4, and further an emission component obtained by integrating these emission components.

Here, for example, in the image display system 100 having such a configuration as described above, in order to improve position detection accuracy of the pointing body in the projector 1, it is important for the light EL from the light emitting device 2 to stably be supplied with a sufficient light intensity. In other words, it is important to prevent that a significant difference occurs in the detection degree by the position in the irradiation target surface SC even if there occurs the intensity unevenness in the light emitting device 2, or the interference pattern due to the diffraction of light.

In particular, in order to suppress the intensity unevenness and the diffraction of the light in the light emitting device 2, the relationship between the focal distance f of the collimator 32 (or 42) and the array pitch P of the small lenses 331 (or 431) constituting the optical element 33 (or 43) becomes important. In the present embodiment, it is assumed that the small lenses 331 (or 431) have the same sizes and the same shapes, and the array pitch P is constant, in other words, the values of the array pitch P are the same in one optical element 33 (or 43). It should be noted that due to the symmetry of the first light emitting section 3 and the second light emitting section 4, only the configuration related to the first light emitting section 3 will hereinafter be described as a general rule, but substantially the same applies to the second light emitting section 4.

Figure 4A:
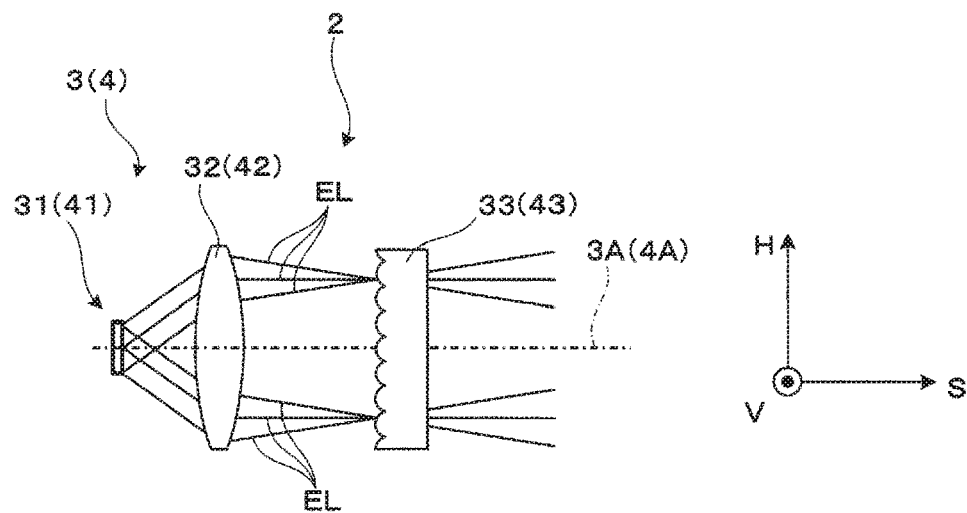
FIG. 4A is a conceptual diagram showing a condition of light emission in the case in which the focal distance of a collimator is short.

For example, in the case in which the focal distance f of the collimator 32 is short as conceptually shown in FIG. 4A, the width of the pencil of the light EL emitted from the collimator 32 also becomes small on the one hand, but the angular width becomes large on the other hand. Therefore, it is necessary to make the array pitch P of the small lenses 331 small (fine). In contrast, in the case in which the focal distance f is long as conceptually shown in, for example, FIG. 4B, if the emission state of the light EL in the light source is substantially the same as in the case of FIG. 4A, the width of the pencil of the light EL emitted from the collimator 32 becomes large, and the angular width becomes small. Therefore, it is possible to make the array pitch P of the small lenses 331 large. It should be noted that the increase in the focal distance f results in growth in size of the device compared to the case of FIG. 4A.

In order to suppress the intensity unevenness of the light EL in the light emitting device 2, it becomes necessary to provide the array pitch P finer than a certain level with respect to the width of the pencil of the light EL taking the fact described above into consideration. In contrast, if the array pitch P is made too fine, the problem of occurrence of the interference pattern due to the diffraction is caused in the light EL in turn. Specifically, there is a possibility that the components of the light EL reinforce each other or cancel out each other by the position in the irradiation target surface SC to cause unevenness in the intensity.

Figure 4B:
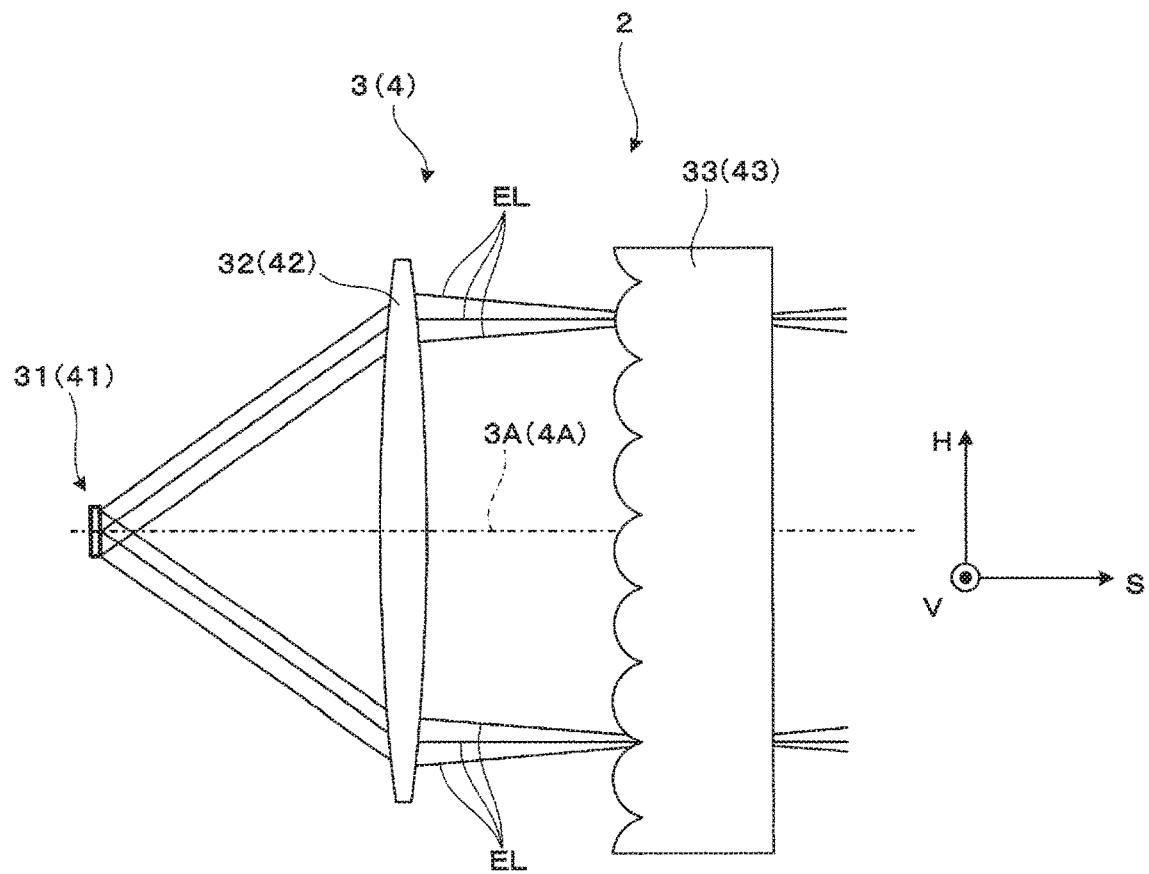
FIG. 4B is a conceptual diagram showing a condition of light emission in the case in which the focal distance of the collimator is long.

In the present embodiment, taking the relationship shown in FIGS. 4A and 4B described above into consideration, the array pitch P of the small lenses 331 with respect to the focal distance f of the collimator 32 is set within a predetermined numerical range based on the proportional relation. Specifically, it is conceivable to set the relationship between the focal distance f and the array pitch P within the range shown in the graph of FIG. 5.

Figure 5:
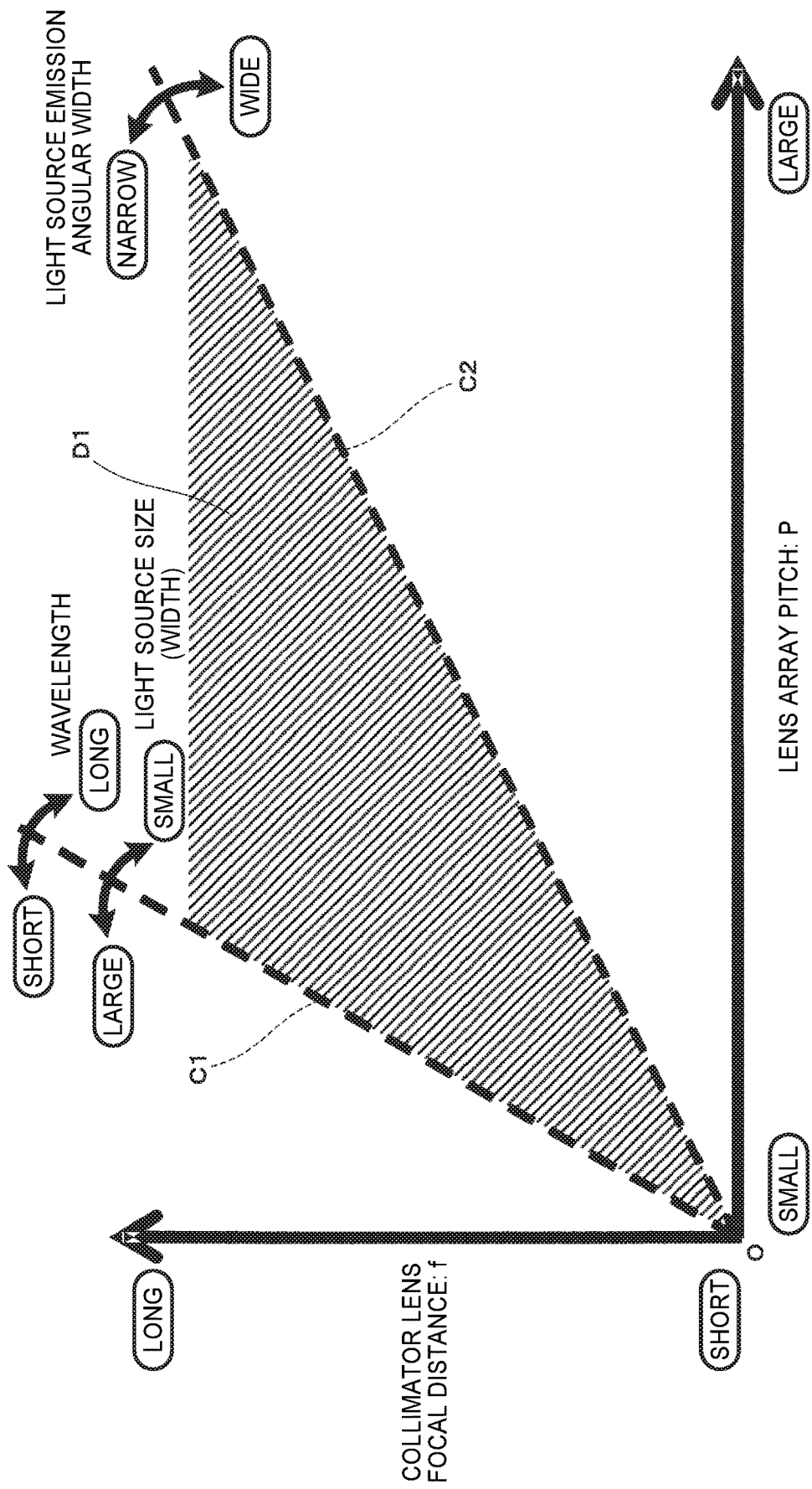
FIG. 5 is a graph showing a relationship between the focal distance of the collimator and an array pitch of a plurality of small lenses or a plurality of lenses.

Firstly, in FIG. 5, the horizontal axis represents the array pitch P, and the vertical axis represents the focal distance f. Here, in the drawing, the predetermined numerical range described above is defined as the area D1 between the straight line C1 and the straight line C2 each of which is a straight line (i.e., a straight line passing through the origin O of the graph) representing the proportional relation between the focal distance f and the array pitch P. Specifically, the straight line C1 side beyond the area D1 represents that the array pitch P of the small lenses 331 is too small (too fine) with respect to the focal distance f of the collimator 32, and there arises the possibility of the influence of the diffraction. In contrast, the straight line C2 side beyond the area D1 represents that the array pitch P is too large with respect to the focal distance f (i.e., with respect to the width of the pencil), and there arises the possibility of the influence of the intensity unevenness.

It should be noted that in the above description, the occurrence of the diffraction and the intensity unevenness are described on the assumption that the light emission on the light source 31 side is in a certain state, but it is conceivable that the range (i.e., the gradients of the straight line C1 and the straight line C2) of the area D1 also changes due to the state of the light source 31. Specifically, the straight line C1 and the straight line C2 are determined in accordance with the emission state of the light such as the wavelength or the spreading state of the light EL from the light source 31. As indicated by bidirectional arrows in the drawing, for example, if the wavelength of the light to be emitted shortens, it becomes more difficult for the diffraction to occur, and the gradient of the straight line C1 becomes steeper. In other words, the range of the area D1 broadens. In contrast, if the wavelength becomes longer, the gradient of the straight line C1 becomes gentler, and the range of the area D1 narrows.

Further, also in the case in which the dimension of the light source 31, namely the width of the light source, increases, surface emission of the light occurs, and therefore, it becomes more difficult for the diffraction to occur, and the gradient of the straight line C1 becomes steeper. In other words, the range of the area D1 broadens. In contrast, if the width of the light source decreases, the gradient of the straight line C1 becomes gentler, and the range of the area D1 narrows.

Further, in the light source 31 (only the light emitting section is shown as a representative) shown in, for example, FIG. 4 or FIG. 6, since the broader the angular width (emission angular width) W (see FIG. 6) of the light EL when generated becomes, the larger the width of the pencil becomes, it becomes easy to enlarge the array pitch P. Therefore, it becomes difficult for the intensity unevenness to occur, and the gradient of the straight line C2 becomes gentler. In other words, the range of the area D1 broadens. In contrast, if the angular width W narrows, the gradient of the straight line C2 becomes steeper, and the range of the area D1 narrows.

Here, if the direction in which the light source 31, 41 is larger in width is set to the direction in which the light is expected to be as parallel as possible, even if the collimation is performed by the collimator 32, an angled component of the light is generated due to the fact that the width of the light source 31, 41 is large, and therefore, the light is made wide-angle to some extent as a result. Therefore, the direction in which the width of the light source 31, 41 broadens is not set to the direction in which the parallel light is emitted as much as possible, but is set to the direction in which the light is made wide-angle. In the related art technology, it is arranged that the direction in which the light source is large in width and the direction in which the spread of the light from the light source is broader are perpendicular to each other (see, e.g., FIG. 4 and so on of Document 1 described above). Taking the above into consideration, in the present embodiment, by enlarging the width of the light source 31, 41 and at the same time broadening the spread of the light in the first direction H, which is an arrangement direction of the small lenses 331, 431, namely the direction in which the light is made wide-angle based on the condition described above considered with reference to FIG. 5, it is possible to further broaden the range of the area D1.

Figure 9:
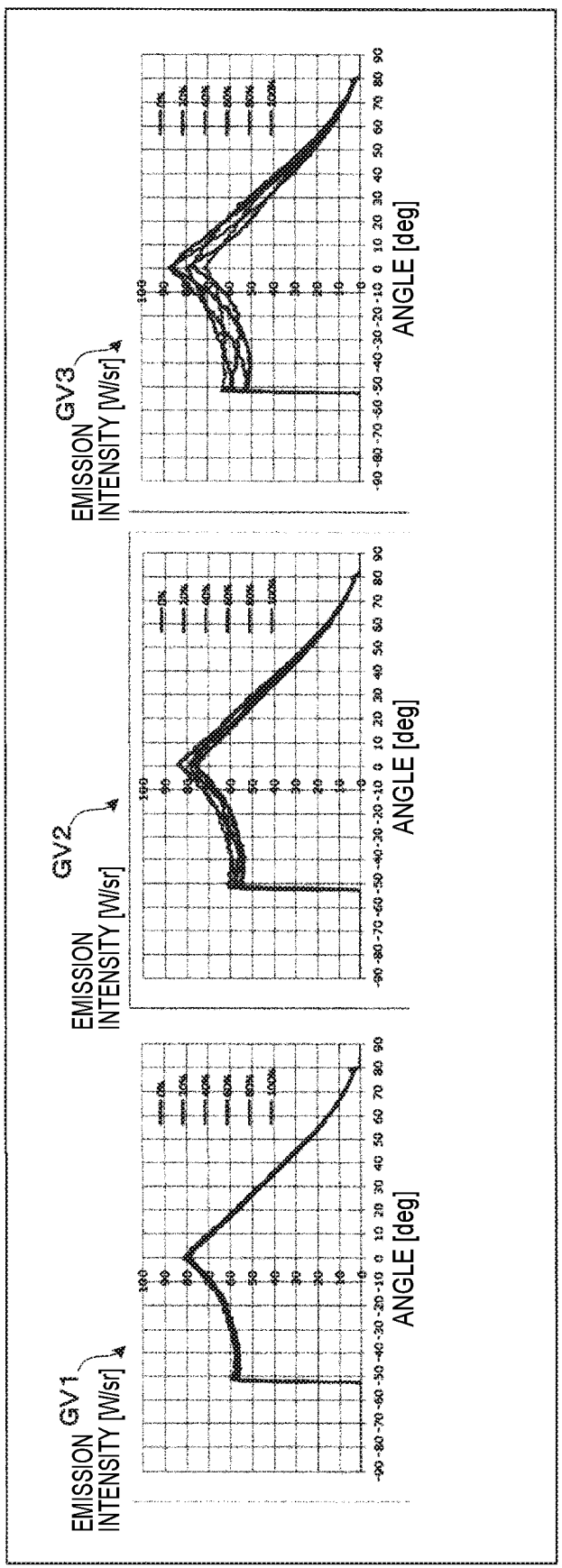
FIG. 9 represents graphs showing a change in intensity unevenness with respect to a change in array pitch of the plurality of small lenses.
Figure 10:
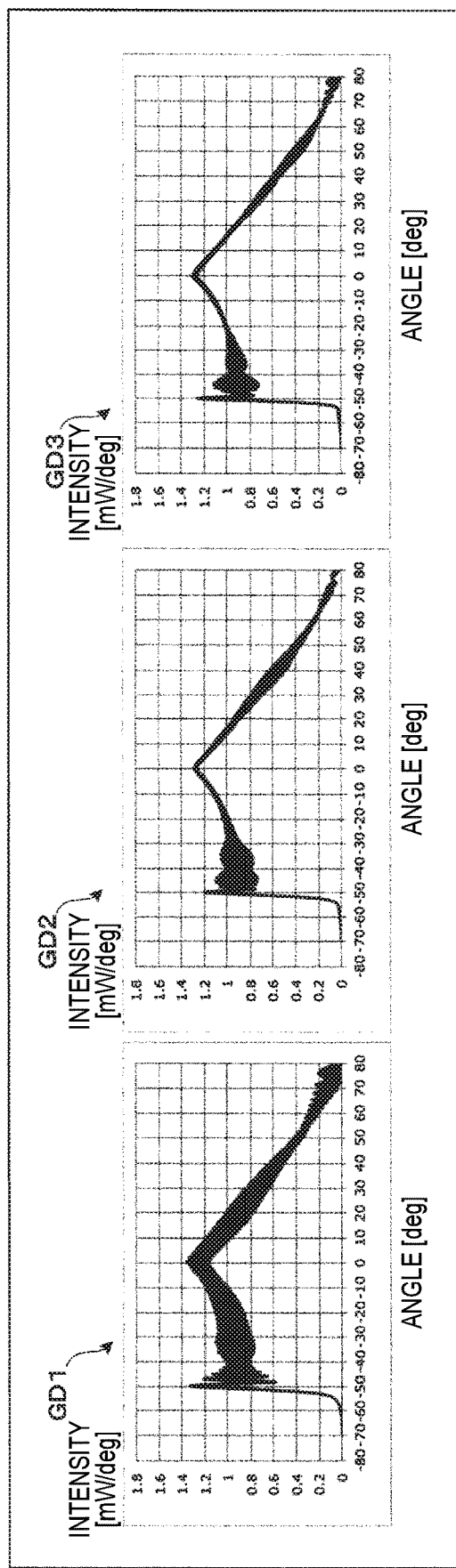
FIG. 10 represents graphs showing a change in interference pattern due to the change in array pitch of the plurality of small lenses.
Figure 11:
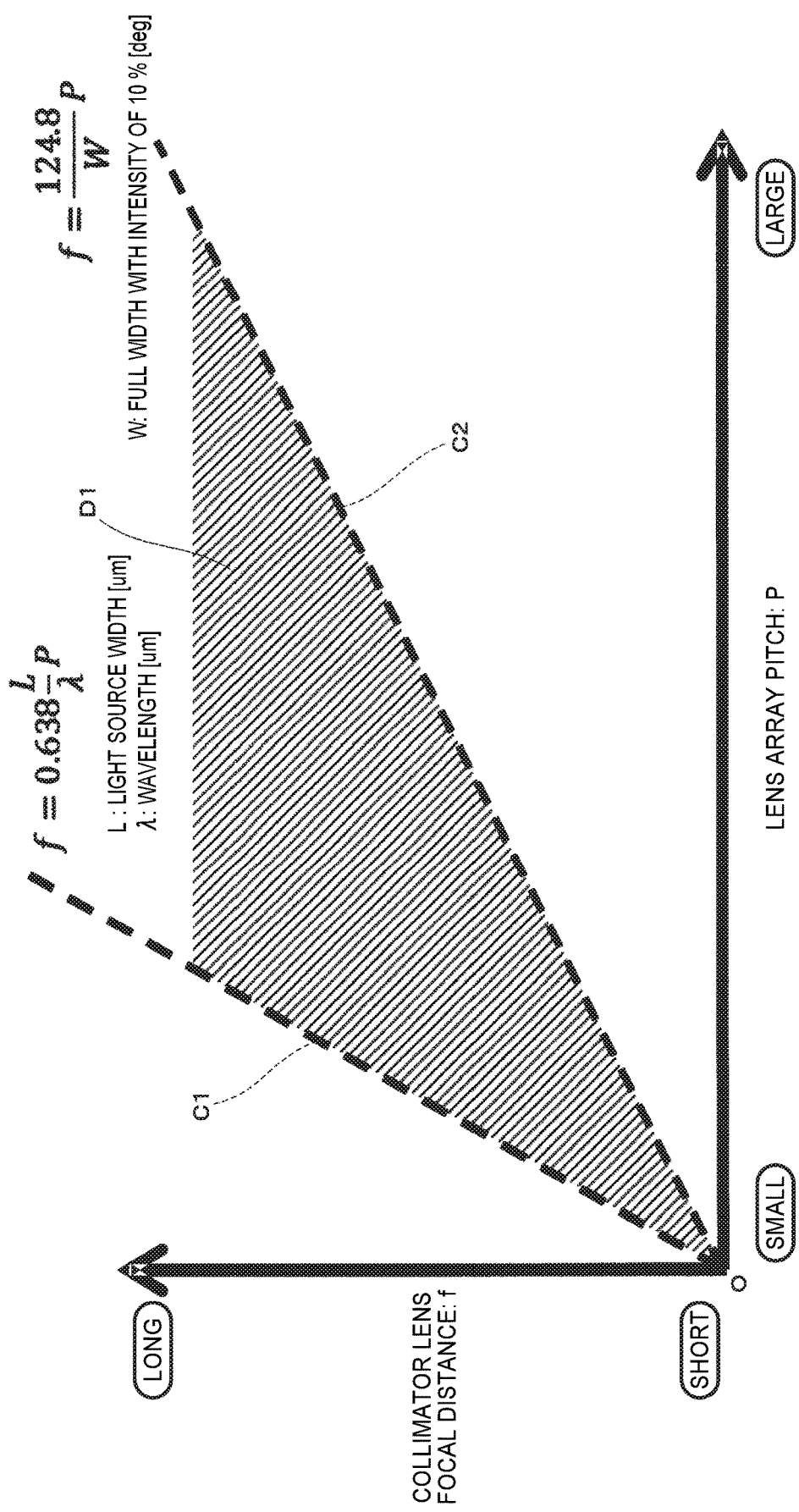
FIG. 11 is a graph showing a numerical relationship which should be fulfilled between the focal distance of the collimator and the array pitch of the plurality of small lenses.

Hereinafter, by considering the one specific example of the light emitting device 2 with reference to FIG. 6 through FIG. 10, an example of specific numerical values related to the area D1 described above, namely related to the straight line C1 and the straight line C2, are shown in FIG. 11 corresponding to FIG. 5 as a final result.

Firstly, as shown in FIG. 6, in one example described here, regarding the light source 31, the dimension of the light source 31, namely the width L of the light source is set to L=11 μm, and the angular width W is set to W=39°. It should be noted that regarding the wavelength λ of the light EL, as having already been described, λ=940 nm (i.e., 0.940 μm) is set as the reference wavelength.

Further, regarding the collimator 32, the focal distance f is set to f=4.48 mm, the diameter φ is set to φ=4 mm.

Further, regarding the optical element 33, the array pitch P of the small lenses 331 is set to correspond to regular intervals of P=0.9 mm.

Figure 7:
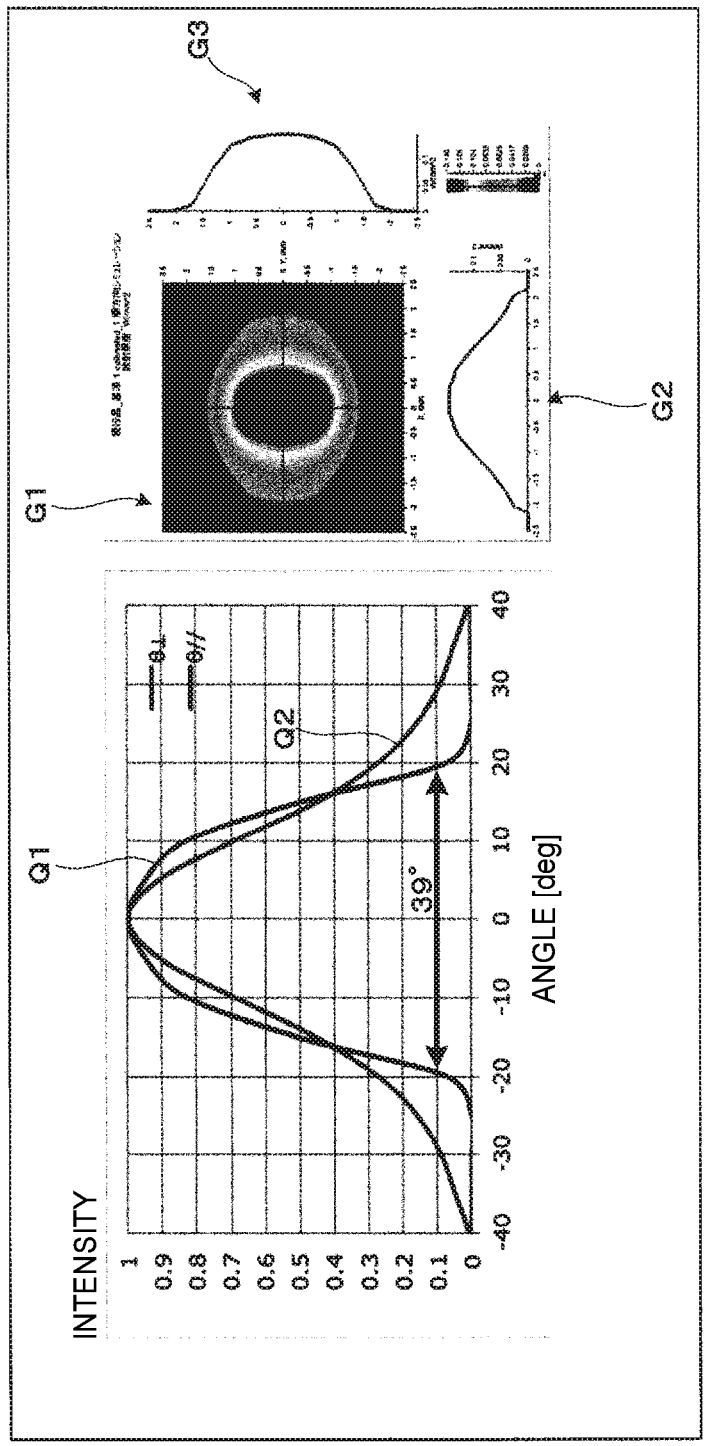
FIG. 7 is a graph showing characteristics of the light emitted from the light source in FIG. 6.

Here, regarding the light EL, it is assumed that such characteristics as shown in FIG. 7 are further provided. Specifically, as shown in the graph on the left side in FIG. 7, the intensity distribution of the light when radiated from the light source 31 has the distribution characteristics indicated by the curve Q1 with respect to the horizontal direction (the first direction H), and has the distribution characteristics indicated by the curve Q2 with respect to the vertical direction (the second direction V). Here, regarding the intensity in the horizontal direction (the first direction H), the range in which the intensity equal to or higher than 10% of the maximum intensity of the light is provided is set to the angular width W of the light EL. That is, looked at from another perspective, this means that the light having such characteristics as the angular range in which the intensity of no lower than 10% of the maximum intensity is provided becomes 39° is emitted from the light source 31. Then, regarding the light EL, the incident intensity distribution to the optical element 33, namely the intensity distribution of incident light to the small lenses 331, is set as shown in the graphs G1 through G3 on the right side in FIG. 7. It should be noted that these graphs are for representing the condition of a cross-section of the pencil of the light EL in the A-A cross-section shown in FIG. 6. Specifically, the light EL is in the state after being collimated through the collimator 32, and before entering the optical element 33. From the graphs G1 through G3, it is understood that there is provided the distribution in which the intensity is high on the central side, and lowers toward the peripheral side. Bypassing through the optical element 33, the light EL in such a state is spread like a curtain so as to cover the entire irradiation target surface SC in the state of being made wide-angle and homogenized due to the diffusing action in the small lenses 331.

Figure 8B:
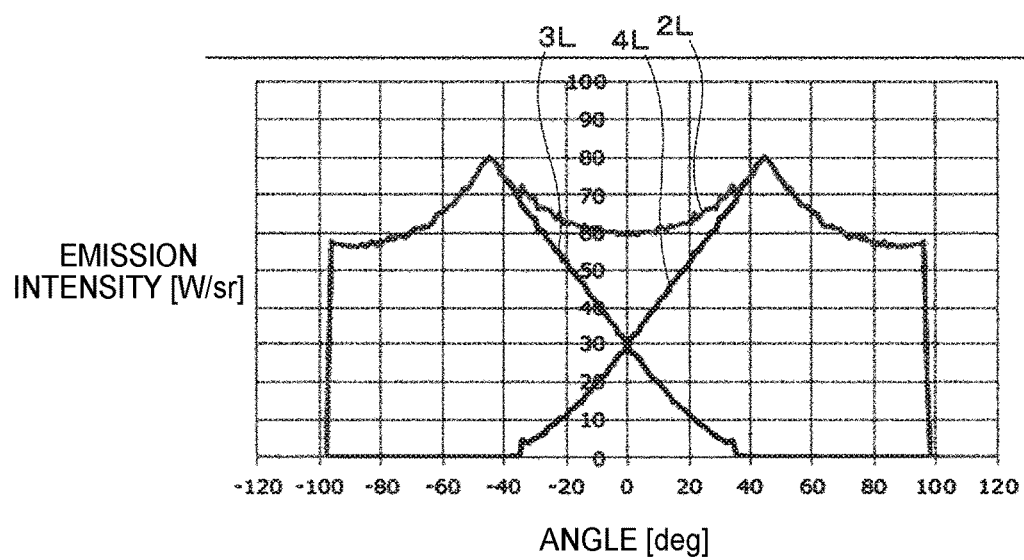
FIG. 8B is a graph showing the intensity distribution of the light emitted from the light emitting device.

FIG. 8A is a diagram schematically showing the intensity distribution of the light EL emitted from the light emitting device 2 to the irradiation target surface SC, and FIG. 8B is a graph showing the intensity distribution of the light EL. FIG. 8A and FIG. 8B both show the intensity at each position. For example, in FIG. 8A, the intensity distribution of the first light emitting section 3 in the light emitting device 2 is denoted by the reference symbol 3L, and the intensity distribution of the second light emitting section is denoted by the reference symbol 4L. The intensity distribution of the light emitting device 2 as a whole is denoted by the reference symbol 2L which corresponds to what is obtained by overlapping the intensity distribution 3L and the intensity distribution 4L with each other. Further, in FIG. 8B, the horizontal axis represents the angle assuming the vertically downward direction (the −Z direction) as the reference, namely 0°, with respect to the irradiation target surface SC to thereby represent the direction or the position, and the vertical axis represents the intensity of the light.

In the present embodiment, as shown in the drawings, in order to ensure the intensity with respect to the lower right part and the lower left part of the irradiation target surface SC which are the farthest from the light emitting device 2, each of the light sources 31, 41 is installed so that the direction (the direction at an angle of zero with the proceeding direction of the light EL) along the optical axis in which the intensity becomes the highest faces to the lower right part and the lower left part of the irradiation target surface SC in accordance with the aspect ratio (e.g., a ratio equal to 2:1 or approximate to 2:1). Therefore, as shown in FIG. 8A and FIG. 8B, in any of the intensity distributions in the light sources 31, 41 and the intensity distribution obtained by totalizing these intensity distributions, the intensity around the directions of ±45° which are the directions toward the lower right part and the lower left part of the irradiation target surface SC is the highest in accordance with the aspect ratio.

In such a configuration as described hereinabove, in the embodiment described above, by changing the array pitch P of the small lenses 331 shown in FIG. 6, which has been set to P=0.9 mm, on the one hand, and by keeping other values such as the focal distance f of the collimator 32 in the fixed state on the other hand, the range which the array pitch P can take is considered.

Firstly, the change the intensity unevenness with respect to the change in the array pitch P is considered. Here, every time the value of the array pitch P is determined, the position of the optical element 33 is changed (moved) in the direction indicated by the bidirectional arrow AR1, namely the horizontal direction (the first direction H), to observe the change in emission intensity with the displacement. FIG. 9 is a graph showing the condition of this change. For example, the graph GV1 on the left side in the drawing shows the condition of the change in the intensity in the case in which the optical element 33 is moved in a range of 0% through 100% with respect to one array pitch P regarding the arrow AR1 in the case in which the array pitch P is set to P=1.3 mm. It should be noted that in this case, completely the same state is obtained due to the regularity (periodicity) of the array between the case in which the optical element 33 is moved 0%, namely is not moved, and the case in which the optical element 33 is moved 100%, namely is moved in position as much as one array pitch P. Therefore, it is conceivable that the condition of the change in the intensity in the case of moving the optical element 33 from 0% to 100% becomes the index representing the intensity unevenness (unevenness in the intensity) which can occur. As shown in the graph GV1, if P=1.3 mm is set, the variation in the light intensity hardly exists, and it is conceivable that the intensity unevenness is sufficiently suppressed. In contrast, the graph GV2 on the central side in FIG. 9 shows the case in which substantially the same as described above is performed in the case of setting P=1.4 mm, and the graph GV3 on the right side in FIG. 9 shows the case in which substantially the same as described above is performed in the case of setting P=1.5 mm. According to the results described above, rather large intensity unevenness occurs in the state (P=1.5 mm) of the graph GV3, and it is conceivable that it is preferable to set the array pitch P to be less than or comparable to P=1.4 mm in order to prevent the intensity unevenness from occurring.

It should be noted that in this case, the diameter ϕ of the collimator 32 is ϕ=4 mm, and the width (the effective width) of the pencil of the light EL made to be a parallel light beam is in roughly the same level. Therefore, with respect to the array pitch P, it results in the fact that more than two, namely a plurality of, small lenses 331 are included in the effective width of the pencil by the light EL. Further, if P=1.3 mm is set, it results in the fact that three small lenses 331 are included in the effective width of the pencil by the light EL.

Then, a change in a degree of occurrence of the interference pattern due to the diffraction with respect to the change in the array pitch P is considered. Here, as shown in the graphs GD1 through GD3 in FIG. 10, every time the value of the array pitch P is determined, the variation width (or an amplitude of oscillation) of the intensity at each angle representing the position in the irradiation target surface SC is checked. For example, the graph GD1 on the left side in the drawing shows the condition of the variation (oscillation) of the intensity in the case of setting the array pitch P to P=0.4 mm. In this case, it is understood that the variation width (or the amplitude of oscillation) of the intensity is considerably large. According to this fact, it is understood that the interference pattern due to the diffraction has occurred, namely there exist a place where the light reinforces each other due to the light interference and a place where the light cancels out each other due to the light interference, and the difference in intensity between these places becomes large. In this case, in particular, there is a possibility that the detection sensitivity at a point where the intensity becomes the lowest is decreased. Therefore, it is desirable that such a variation (oscillation) in the intensity is sufficiently suppressed. The graph GD2 on the central side in the drawing shows the case in which substantially the same as described above is performed in the case of setting P=0.5 mm, and the graph GD3 on the right side in the drawing shows the case in which substantially the same as described above is performed in the case of setting P=0.6 mm. According to the results described above, in the state (P=0.6 mm) of the graph GD3, the variation (oscillation) of the intensity, namely occurrence of the interference pattern due to the diffraction, is sufficiently suppressed. Therefore, in this case, it is conceivable that it is preferable to set the array pitch P to be more than or comparable to P=0.6 mm.

Taking the above into consideration, derivation of such an example of specific numerical values with respect to the area D1, namely the straight line C1 and the straight line C2, as shown in FIG. 11 will be attempted.

Firstly, as having already been described, the straight line C1 and the straight line C2 each represent the proportional relationship between the focal distance f and the array pitch P. Therefore, the following is obtained.

$$f \propto P$$

Assuming the proportional constant of the straight line C1 as $k_1$, and the proportional constant of the straight line C2 as $k_2$, these straight lines are expressed as follows.

$$f = k_1 P$$

$$f = k_2 P$$

Therefore, the area D1 is expressed as follows.

$$f \leq k_1 P$$

and $$f \geq k_2 P$$

Further, as described with reference to FIG. 5, the straight line C1 and the straight line C2 can also be changed in accordance with the emission state of the light EL.

Here, matters related to the straight line C1 will firstly be considered. In the case described above, as having already been described, the shorter (smaller) the wavelength λ (unit: μm) of the infrared light used as, for example, the light EL becomes, the steeper the gradient of the straight line C1 becomes. In other words, the range of the area D1 broadens. Therefore, the wavelength λ becomes an inversely proportional factor in the expression related to such a straight line C1 as described above.

Further, for example, the broader (larger) the width L (unit: μm) of the light source 31 becomes, namely the broader (larger) the range of the light EL when being emitted becomes, the steeper the gradient of the straight line C1 becomes. In other words, the range of the area D1 broadens.

Therefore, the width L becomes a proportional factor in the expression related to such a straight line C1 as described above. Therefore, the following is obtained.

$$f \propto \frac{L}{\lambda} P$$

Assuming the proportional constant of the straight line C1 newly as $K_1$, the following is obtained.

$$f = K_1 \frac{L}{\lambda} P$$

Here, when substituting the values in the example described above, namely f=4.48 mm, λ=0.940 µm, and L=11 µm, since it is desirable to set the lower limit of the array pitch P to a value comparable to P=0.6 mm, it is understood that it is desirable to set the $K_1$ to $K_1$=0.638, namely set the straight line C1 as follows.

$$f = 0.638 \frac{L}{\lambda} P$$

Then, matters related to the straight line C2 will be considered. In the case described above, as having already been described, the broader (larger) the angular width W (unit: °) of the light source 31 becomes, the gentler the gradient of the straight line C2 becomes. In other words, the range of the area D1 broadens. Therefore, the angular width W becomes a proportional factor in the expression related to such a straight line C2 as described above. Therefore, the following is obtained.

$$f \propto \frac{1}{W} P$$

Assuming the proportional constant of the straight line C2 newly as $K_2$, the following is obtained.

$$f = K_2 \frac{1}{W} P$$

Here, when substituting the values in the example described above, namely f=4.48 mm, W=39°, and L=11 µm, since it is desirable to set the upper limit of the array pitch P to a value comparable to P=1.4 mm, it is understood that it is desirable to set the $K_2$ to $K_2$=124.8, namely set the straight line C2 as follows.

$$f = \frac{124.8}{W} P$$

When showing the above with respect to the area D1 similarly to the case described above, in the case of assuming the focal distance of the collimator 32 as f mm, the array pitch of the small lenses 331 as P mm, the wavelength of the light EL from the light source 31 as λ µm, the width of the light source 31 as L µm, and the angular width of the light EL from the light source 31 as W°, it results in the fact that the following is fulfilled.

$$f \leq 0.638 \frac{L}{\lambda} P \quad (1)$$

$$f \geq \frac{124.8}{W} P \quad (2)$$

As is obvious from the above description, in this case, it is possible to prevent the diffraction from occurring by fulfilling the formula (1) described above, and at the same time, it is possible to suppress the intensity unevenness by fulfilling the formula (2) described above.

As described above, in the present embodiment, reduction in size of the device and reduction in required assembly accuracy are achieved by using the optical elements 33, 43 formed of the small lenses 331, 431, respectively. On that basis, by further setting the array pitch P of each of the small lenses 331, 431 within the predetermined numerical range determined based on the proportional relationship between the both factors with respect to the focal distance f of each of the collimators 32, 42, it is possible to prevent the intensity unevenness and the diffraction due to the small lenses 331, 431 respectively constituting the optical elements 33, 43 from occurring to maintain the good emission state of the light.

It should be noted that it is possible to make substantially the same consideration as described above also in a configuration different in, for example, the value of the focal distance f from the case (f=4.48 mm) described above. In particular, since the proportional and inversely proportional relationships are substantially the same, it is conceivable that the constant $K_1$ and so on thus obtained become substantially the same as in the case described above also in the similar configuration different in the value of the focal distance f and so on. Therefore, it is conceivable that by adopting the configuration having the relationship fulfilling the formulas (1), (2) described above, there is a high possibility that it is possible to keep the good light emission state in a similar manner also in the case of substantially the same configuration as described above and different in the numerical values.

Second Embodiment

A light emitting device according to a second embodiment will hereinafter be described with reference to FIG. 12 through FIG. 14. The present embodiment is a modified example of the first embodiment, and is substantially the same as the case of the first embodiment except the configuration of the small lenses in the optical element. Therefore, regarding those having the same function, the same reference symbols are applied, and the detailed description and the illustration of each section will be omitted. Further, the application to the image display system is also substantially the same as in the case of the first embodiment, and is therefore omitted.

Figure 12:
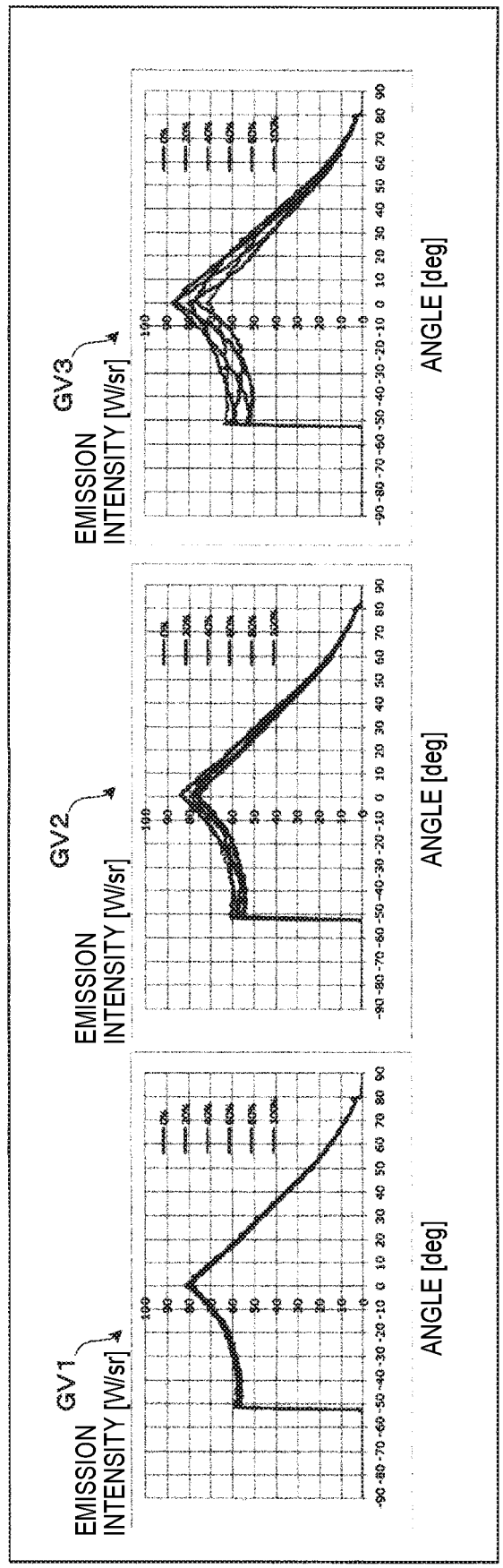
FIG. 12 represents graphs showing a change in intensity unevenness with respect to a change in array pitch of a plurality of small lenses in a light emitting device according to a second embodiment of the invention.
Figure 13:
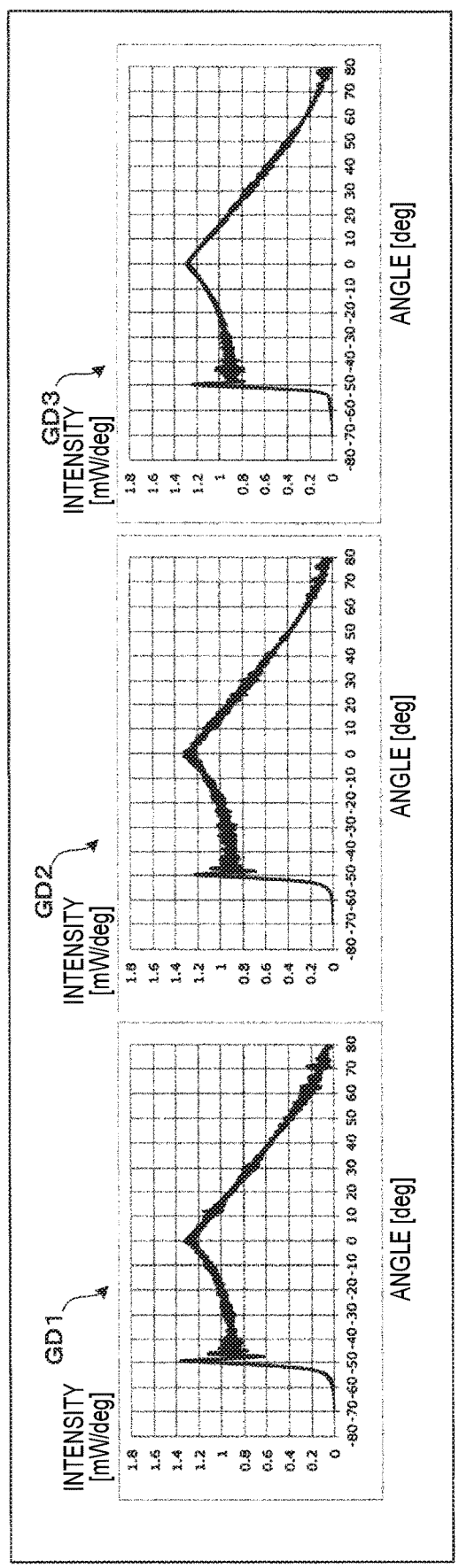
FIG. 13 represents graphs showing a change in interference pattern due to the change in array pitch of the plurality of small lenses.
Figure 14:
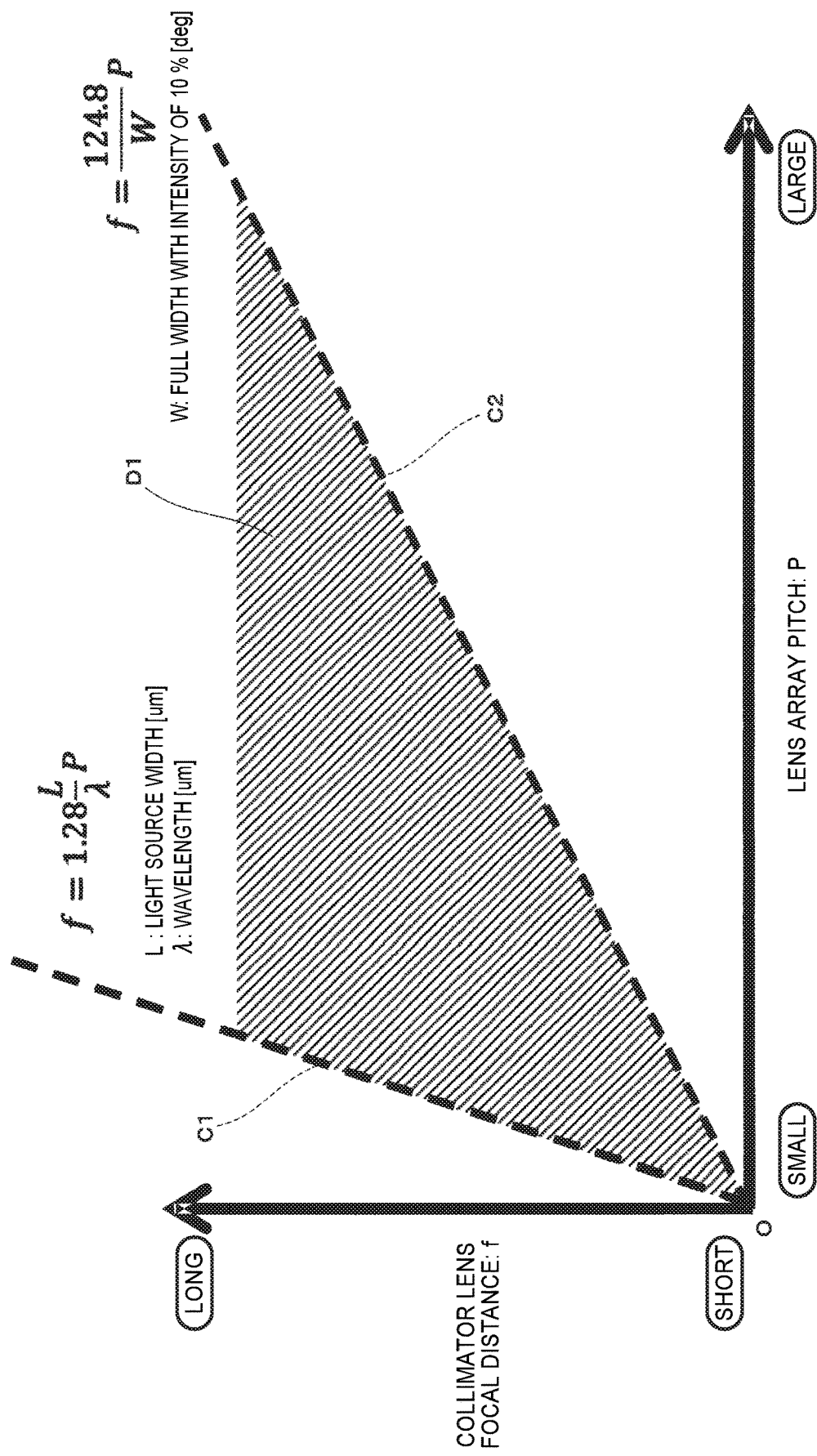
FIG. 14 is a graph showing a numerical relationship which should be fulfilled between the focal distance of the collimator and the array pitch of the plurality of small lenses.

FIG. 12 through FIG. 14 are diagrams corresponding respectively to FIG. 9 through FIG. 11 described in the first embodiment, and show the characteristics of the small lenses and the relational expressions in the present embodiment.

The present embodiment is different from the first embodiment, which the pitch is set to a constant value, in the point that the array pitch has different values within a predetermined range, or has an irregular alignment within a predetermined range in the small lenses. Here, as an example, it is assumed that the pitch of the small lenses is made random in a range of ±30% with respect to the array pitch P as the central value to be the reference. For example, it is conceivable that the small lenses are formed to have similarity shapes different in size from each other.

Firstly, regarding the intensity unevenness, substantially the same matter as in the case described with reference to FIG. 9 in the first embodiment is shown by the graph in FIG. 12. Specifically, in FIG. 12, for example, the graph GV1 on the left side in the drawing shows the condition of the intensity variation in the case of providing the lens array having the array pitch P as the central value to be the reference set to P=1.3 mm, and having a random value in the range of ±30%. It should be noted that one array pitch P here is assumed as one reference array pitch P. Similar to the case of making the description regarding the graph GV1, the graph GV2 on the central side in FIG. 12 is obtained in the case of setting P=1.4 mm, and the graph GV3 on the right side in FIG. 12 is obtained in the case of setting P=1.5 mm. According to the results described above, rather large intensity unevenness occurs in the state (P=1.5 mm) of the graph GV3, and it is conceivable that it is preferable to set the array pitch P to be less than or comparable to P=1.4 mm in order to prevent such intensity unevenness from occurring. Therefore, it has been found out that roughly the same as the case of the first embodiment is applied.

In contrast, regarding the degree of occurrence of the interference pattern due to the diffraction, there occurs a result different from the case of the first embodiment. Here, substantially the same matter as in the case described with reference to FIG. 10 in the first embodiment is shown by the graph in FIG. 13. Specifically, in FIG. 13, for example, the graph GD1 on the left side in the drawing shows the condition of the intensity variation (oscillation) in the case of providing the lens array having the reference array pitch P set to P=0.3 mm, and having the random value in the range of ±30%. Similarly, the graph GD2 on the central side in FIG. 13 shows the case of the performance in the case of setting the reference array pitch to P=0.4 mm, and the graph GD3 on the right side in FIG. 13 shows the case of the performance in the case of setting the reference array pitch to P=0.5 mm. According to the results described above, in the state (P=0.3 mm) of the graph GD1, the variation (oscillation) of the intensity, namely occurrence of the interference pattern due to the diffraction, is sufficiently suppressed. Therefore, in this case, it is conceivable that it is preferable to set the reference array pitch P to be more than or comparable to P=0.3 mm. In this case, it is conceivable that the factor is the fact that, in particular, the interference pattern due to the diffraction becomes difficult to occur by adopting the configuration having the irregular alignment.

Taking the above into consideration, derivation of such an example of specific numerical values with respect to the area D1, namely the straight line C1 and the straight line C2, as shown in FIG. 14 will be attempted.

Firstly, matters related to the straight line C1 will be considered. Similar to the case of the first embodiment, the following is assumed.

$$f \propto \frac{L}{\lambda} P$$

Assuming the proportional constant of the straight line C1 newly as $K_1$, the following is obtained.

$$f = K_1 \frac{L}{\lambda} P$$

Here, when substituting the values in the example described above, namely f=4.48 mm, λ=0.940 μm, and L=11 μm, since it is desirable to set the lower limit of the array pitch P to a value comparable to P=0.3 mm, it is understood that it is desirable to set the $K_1$ to $K_1$=1.28, namely set the straight line C1 as follows.

$$f = 1.28 \frac{L}{\lambda} P$$

In contrast, regarding the straight line C2, since no numerical difference is observed from the case of the first embodiment regarding the matter related to the intensity unevenness, it is understood that it is desirable to be expressed as follows.

$$f = \frac{124.8}{W} P$$

When showing the above with respect to the area D1 similarly to the case described above, in the case of assuming the focal distance of the collimator 32 as f mm, the array pitch of the small lenses 331 as P mm, the wavelength of the light EL from the light source 31 as λ μm, the width of the light source 31 as L μm, and the angular width of the light EL from the light source 31 as W°, it results in the fact that the following is fulfilled.

$$f \leq 1.28 \frac{L}{\lambda} P \tag{3}$$

$$f \geq \frac{124.8}{W} P \tag{4}$$

As is obvious from the above description, in this case, it is possible to prevent the diffraction from occurring by the array pitch P of the small lenses fulfilling the formula (3) described above while being provided with the random value within the predetermined range, and at the same time, it is possible to suppress the intensity unevenness by fulfilling the formula (4) described above.

As described above, also in the present embodiment, reduction in size of the device and reduction in required assembly accuracy are achieved by using the optical element formed of the small lenses. On that basis, by further setting the array pitch P of each of the small lenses within the predetermined numerical range determined based on the proportional relationship between the both factors with respect to the focal distance f of the collimator, it is possible to prevent the intensity unevenness and the diffraction due to the small lenses constituting the optical element from occurring to maintain the good emission state of the light.

Third Embodiment

A light emitting device according to a third embodiment will hereinafter be described with reference to FIG. 15 and FIG. 16. The present embodiment is a modified example of the first embodiment and so on, and is substantially the same as the case of the first embodiment and so on except the configuration of the optical element. Therefore, regarding those having the same function, the same reference symbols are applied, and the detailed description of each section will be omitted. Further, the application to the image display system is also substantially the same as in the case of the first embodiment, and is therefore omitted.

Figure 15:
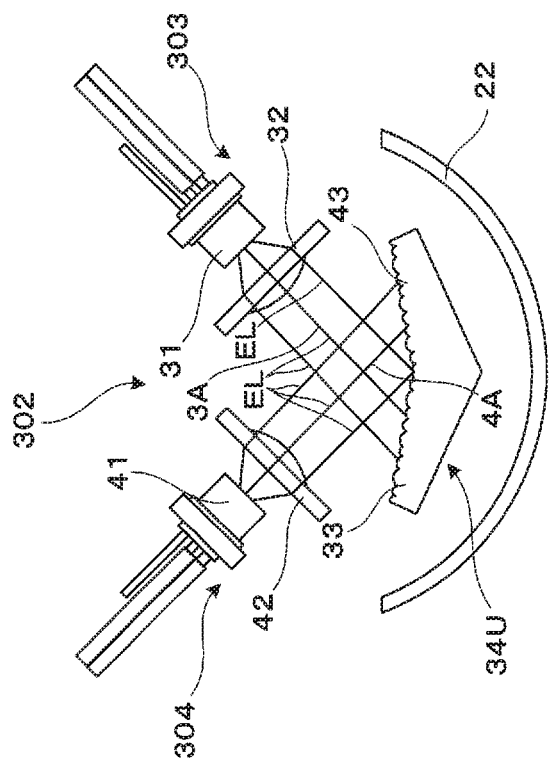
FIG. 15 is a schematic diagram showing a schematic configuration of a light emitting device according to a third embodiment of the invention.
Figure 16:
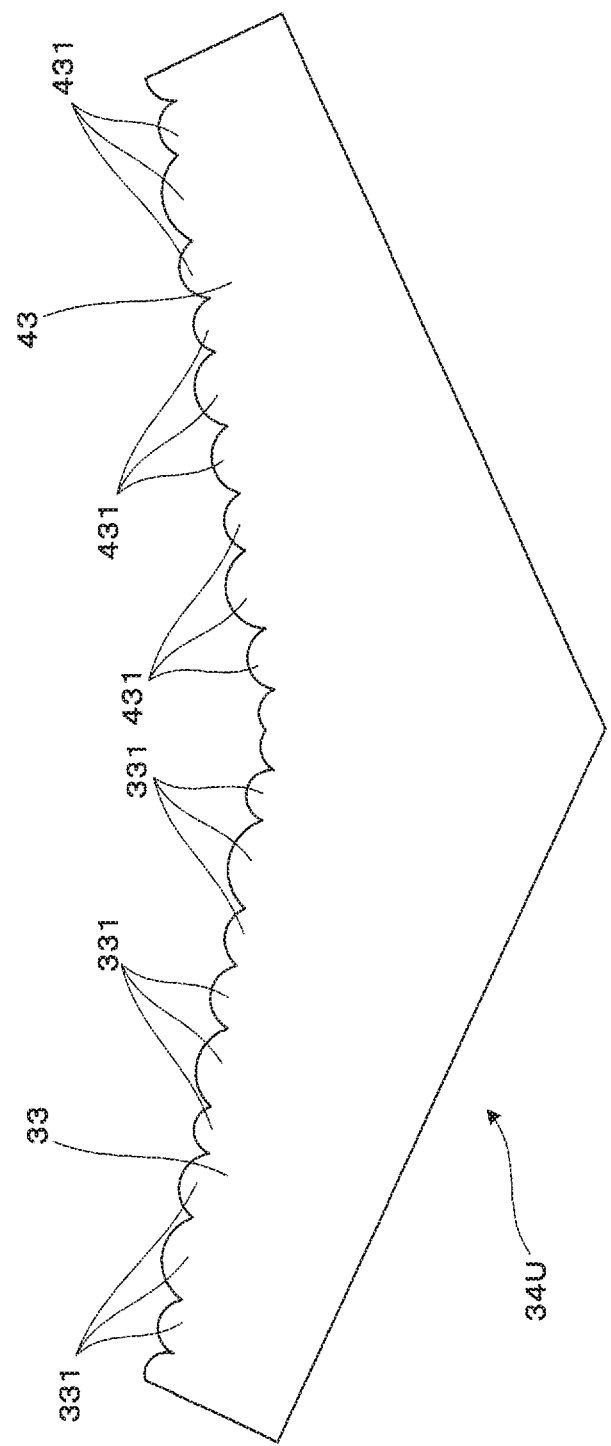
FIG. 16 is a diagram showing an optical element constituted by the plurality of small lenses in FIG. 15 in an enlarged manner.

The present embodiment is different from the other embodiments in the point that the first optical element 33 and the second optical element 43, which are individual members in the first embodiment and so on, are integrated into the optical element 34U as shown in FIG. 15 and FIG. 16.

In more specific description, firstly, FIG. 15 is a diagram corresponding to FIG. 3, and in a schematic configuration shown in FIG. 15, a light emitting device 302 according to the present embodiment is provided with a first light emitting section 303, a second light emitting section 304 and a cover glass 22 covering the first light emitting section 303 and the second light emitting section 304. Among these constituents, the first light emitting section 303 is provided with the first light source 31, the first collimator 32 and the first optical element 33, and the second light emitting section 304 is provided with the second light source 41, the second collimator 42 and the second optical element 43 similarly to the first light emitting section 303. It should be noted that the first optical element 33 of the first light emitting section 303 and the second optical element 43 of the second light emitting section 304 are integrated into the optical element 34U as a single member. The optical element 34U is formed of synthetic resin high in refractive index or the like, provided with the first optical element 33 on the left side and the second optical element 43 on the right side, and formed to have a bilaterally symmetrical shape.

It should be noted that the small lenses 331, 431 respectively constituting the optical elements 33, 43 an example of which is shown in FIG. 16 can be provided with a variety of shapes. For example, it is conceivable that the random value is provided to the array pitch P as in the case of the second embodiment in addition to the case of setting the array pitch P to a constant value as in the case of the first embodiment.

As described above, also in the present embodiment, reduction in size of the device and reduction in required assembly accuracy are achieved by using the optical element 34U obtained by integrating optical elements 33, 43 respectively formed of the small lenses 331, 431 with each other. On that basis, by further setting the array pitch P of each of the small lenses within the predetermined numerical range determined based on the proportional relationship between the both factors with respect to the focal distance f of the collimator, it is possible to prevent the intensity unevenness and the diffraction due to the small lenses constituting the optical element from occurring to maintain the good emission state of the light.

Other Issues

Although the invention is hereinabove described along the embodiments, the invention is not limited to the embodiments described above, but can be implemented in a variety of forms within the scope or the spirit of the invention.

Firstly, in each of the embodiments described above, a variety of curved surface shapes can be adopted as the shape of each of the small lenses constituting the lens array on the assumption that the intended wide-angle conversion or the like can be achieved. For example, it is possible to adopt the case of providing a spherical shape or an aspherical shape. Further, it is also possible to adopt the case of providing a symmetrical property with respect to the direction in which the optical axis extends, and in addition, the case of providing an asymmetrical shape.

Further, regarding the variety of types of values in the light sources, it is possible to adopt a variety of values, and there can be adopted those having a variety of values as, for example, the wavelength λ of the light EL, the width L of the light source 31, or the angular width W of the light EL. On this occasion, it results in the fact that the design of, for example, the collimator 32 and the optical element 33 is determined so as to be in the range fulfilling the relationship described above.

Further, although in each of the embodiments described above, there is described the configuration of using the so-called front-type projector 1 as the image display system 100, this is not a limitation providing the configuration uses a device for displaying an image. For example, it is also possible to adopt a configuration of covering the image display surface such as a liquid crystal display or an organic EL display with the light from the light emitting device.

The entire disclosure of Japanese Patent Application No. 2018-003159, filed on Jan. 12, 2018 is expressly incorporated by reference herein.

What is claimed is:

1. A light emitting device comprising:
a light source adapted to emit light;
a collimator adapted to collimate the light emitted from the light source; and
an optical element having a plurality of lenses adapted to make the light having passed through the collimator have a wide-angle with respect to a first direction that intersects with an optical axis of the light source,
wherein the lenses are arranged along the first direction,
an array pitch in the first direction of the lenses is proportional to a focal distance of the collimator within a predetermined numerical range, and
the focal distance of the collimator is f mm, the array pitch in the first direction of the lenses is P mm, a wavelength of the light from the light source is λ µm, a width in the first direction of the light source is L µm, and an angular width in the first direction of the light from the light source is W° such that the following relationships are both fulfilled:

$$f \leq 0.638 \frac{L}{\lambda} P \quad (1)$$

$$f \geq \frac{124.8}{W} P. \quad (2)$$

2. The light emitting device according to claim 1, wherein the angular width of the light from the light source is in a range having intensity of no lower than 10% to a maximum intensity of the light.

3. An image display system comprising:
the light emitting device according to claim 2;
a detection device adapted to detect a reflection position of light emitted from the light emitting device; and
a projection device adapted to project an image corresponding to a detection result detected by the detection device.

4. The light emitting device according to claim 1, wherein more than two of the lenses are included in an effective width of a pencil by the light from the light source.

5. An image display system comprising:
the light emitting device according to claim 3;

a detection device adapted to detect a reflection position of light emitted from the light emitting device; and a projection device adapted to project an image corresponding to a detection result detected by the detection device.

6. The light emitting device according to claim 1, wherein the light source includes an active layer configured to emit the light and a cladding layer, the active layer and the cladding layer being stacked in a second direction, and the first direction and the second direction are perpendicular to the optical axis of the light source, and are perpendicular to each other.

7. An image display system comprising:

the light emitting device according to claim 6;

a detection device adapted to detect a reflection position of light emitted from the light emitting device; and a projection device adapted to project an image corresponding to a detection result detected by the detection device.

8. An image display system comprising:

the light emitting device according to claim 1;

a detection device adapted to detect a reflection position of light emitted from the light emitting device; and a projection device adapted to project an image corresponding to a detection result detected by the detection device.

9. A light emitting device comprising:

a light source adapted to emit light;

a collimator adapted to collimate the light emitted from the light source; and an optical element having a plurality of lenses adapted to make the light having passed through the collimator have a wide-angle with respect to a first direction that intersects with an optical axis of the light source, wherein the lenses are arranged along the first direction, an array pitch in the first direction of the lenses is proportional to a focal distance of the collimator within a predetermined numerical range, the array pitch in the first direction of the lenses has different values in a predetermined range in the optical element, and the focal distance of the collimator is f mm, a central value of the array pitch in the first direction of the plurality of lenses is P mm, a wavelength of the light from the light source is $\lambda$ μm, a width of the light source is L μm, and an angular width in the first direction of the light from the light source is W° such that the following relationships are both fulfilled:

$$f \leq 1.28 \frac{L}{\lambda} P \qquad (3)$$

$$f \geq \frac{124.8}{W} P. \qquad (4)$$

10. An image display system comprising:

the light emitting device according to claim 9;

a detection device adapted to detect a reflection position of light emitted from the light emitting device; and a projection device adapted to project an image corresponding to a detection result detected by the detection device.

11. The light emitting device according to claim 9, wherein the angular width of the light from the light source is in a range having intensity of no lower than 10% to a maximum intensity of the light.

* * * * *